United States Patent [19]

Riggle et al.

[11] Patent Number: 5,279,400
[45] Date of Patent: Jan. 18, 1994

[54] ONE-WAY ROLLER CLUTCH

[75] Inventors: John F. Riggle, Aurora; Russell J. Rutke, Palo Heights, both of Ill.

[73] Assignee: Borg-Warner Automotive Inc., Sterling Heights, Mich.

[21] Appl. No.: 986,945

[22] Filed: Dec. 8, 1992

[51] Int. Cl.$^5$ ............................................. F16D 41/06
[52] U.S. Cl. ................................. 192/45; 188/82.84
[58] Field of Search .................. 192/45; 188/82.84; 267/165, 166.1

[56] References Cited

U.S. PATENT DOCUMENTS

| | | | |
|---|---|---|---|
| 3,086,632 | 4/1963 | Wade et al. | 192/45 |
| 3,727,902 | 4/1973 | Burckhardt et al. | 267/166.1 |
| 3,760,914 | 9/1973 | Gelbrich | 192/45 |
| 3,917,036 | 11/1975 | Johnson et al. | 192/45 |
| 5,176,232 | 1/1993 | Malecha | 192/45 |

FOREIGN PATENT DOCUMENTS

| | | | |
|---|---|---|---|
| 52-19847 | 2/1977 | Japan | 192/45 |
| 2229236 | 9/1990 | United Kingdom. | |

Primary Examiner—Richard M. Lorence
Attorney, Agent, or Firm—Reising, Ethington, et al.

[57] ABSTRACT

A one-way roller clutch has an inner race, an outer race, a plurality of rollers that are disposed between the races and a cage assembly that is keyed to the outer race. The cage assembly anchors a plurality of energizing springs that bias the rollers toward an engaged position where the rollers are wedged between the races so that one race drives the other. The energizing springs are variable rate springs that produce exponentially increasing spring forces that counteract the centrifugal force of the rollers so as to reduce roller displacement during overrunning and response time for clutch engagement for all operating speeds of the one-way roller clutch.

14 Claims, 3 Drawing Sheets

ONE-WAY ROLLER CLUTCH

BACKGROUND OF THE INVENTION

This invention relates generally to one-way clutches and more particularly to one-way roller clutches that have energizing springs that bias the rollers toward an engaged position where the rollers are wedged between the races so that one race drives the other in one direction.

One-way roller clutches typically have energizing springs, generally accordion shaped, biasing the rollers toward an engaged position wedged between cam surfaces of one race and a cylindrical surface of an associated race. Examples of such one-way roller clutches are shown in U.S. Pat. No. 3,760,914 for a Roller Type Freewheel Clutch granted to Werner W. Gelbrich Sep. 25, 1973; U.S. Pat. No. 3,917,036 for a Molded Cage for an Overrunning roller Clutch granted to Lawrence P. Johnson and Oscar G. Kitchen Nov. 4, 1975 and UK Patent Application GB 2 229 236 of NTN Corporation for a Clutch with Torque Limiter published Sep. 19, 1990.

The purpose of applying a spring force to the rollers is to keep the rollers at an incipient engagement position when the one-way roller clutch is overrunning so that the roller clutch engages immediately upon torque reversal for all operational speeds. However, the above examples and other known one-way roller clutches cannot accomplish this purpose completely because constant rate energizing springs are used. These constant rate energizing springs apply a linearly increasing spring force to the rollers to counteract the centrifugal force of the rollers that increases exponentially with rotational speed. The centrifugal force in fact increases in proportion to the square of the rotational speed. This mismatch produces roller displacements away from the incipient engagement position and lift offs from the raceway surface that increase in proportion to the square of the rotational speed. The response time for clutch engagement upon torque reversal varies and increases in proportion to the roller lift off distance.

The roller displacements and response time can be reduced at higher speeds by increasing the initial bias of the constant rate energizing springs. However, this produces high clutch drag and unnecessary wear at lower operating speeds.

SUMMARY OF THE INVENTION

The object of this invention is to provide a one-way roller clutch that has smaller variations in roller displacement and lift off and more consistent clutch engagement response times over the operating speed range of the one-way roller clutch without producing significantly higher drag and wear at lower speeds.

A feature of the one-way roller clutch according to this invention is that it has energizing springs that are variable rate springs that match the force requirements for keeping the rollers at an incipient engagement position more closely for all operating speeds.

Another feature of the one-way roller clutch according to this invention is that it has energizing springs that are variable rate springs that produce spring forces that counteract centrifugal force more effectively.

Yet another feature of the one-way roller clutch according to this invention is that it has energizing springs that are variable rate springs that produce spring forces that keep the rollers closer to an incipient engagement position at all rotational speeds.

One advantage of a one-way roller clutch according to the invention is that roller travel required for clutch engagement is small and nearly the same for all rotational speeds. In other words the roller displacement is relatively insensitive to rotational speeds with a variable rate spring. Consequently the one-way roller clutch of this invention is well suited for applications where an outer cam race free wheels at high rotational speeds.

Another advantage of the one-way roller clutch according to the invention is that the roller size or mass has less of an effect on spring deflection and thus the roller displacement is approximately the same in spite of roller size or mass. Consequently the one-way roller clutch of this invention is well suited for applications that require large or heavy rollers.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
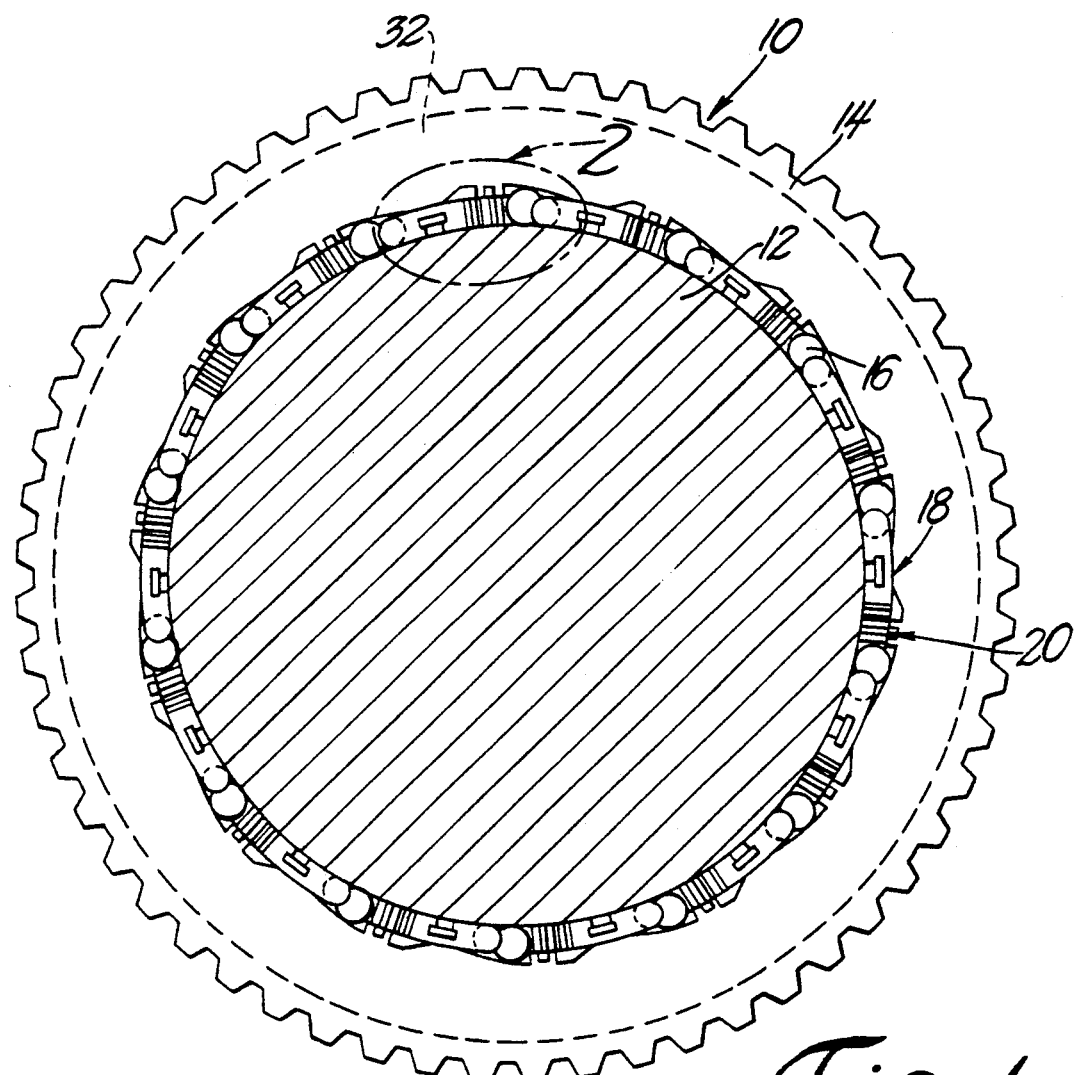
FIG. 1 is a transverse cross section of a one-way roller clutch in accordance with the invention.

Referring now to the drawing, a one-way roller clutch 10 in accordance with the invention comprises an inner race 12, an outer race 14, a plurality of rollers 16 disposed between the races 12 and 14, a cage assembly 18 and a plurality of energizing springs 20 for biasing the rollers toward a clutch engaged position where the rollers 16 are wedged between the races 12 and 14.

The inner race 12 has an outer cylindrical surface 22 while the inner surface of the outer race 14 has a plurality of circumferentially spaced clutch cam surfaces 24 and a plurality of axial slots 26. The rollers 16 ride on the cylindrical surface 22 and the clutch cam surfaces 24. The rollers 16 are wedged into engagement with these surfaces in response to relative rotation of the outer race 14 with respect to the inner race 12 in the counter-clockwise direction as indicated by the arrow 28 in FIG. 2. Thus the outer race 14 drives the inner race 12 in the counter clockwise direction. Or conversely, the inner race 12 drives the outer race 14 in the clockwise direction.

Figure 3:
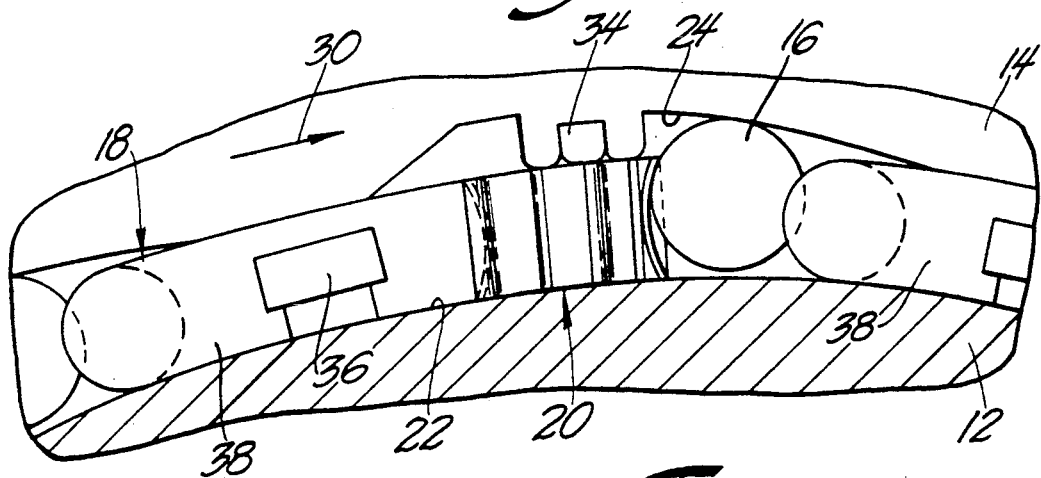
FIG. 3 is an enlargement similar to figure 2 showing the rollers displaced from the incipient engagement position and lifted off the inner raceway.

On the other hand, the rollers 16 back off from wedging engagement with the surfaces 22 and 24 in response to relative rotation of the outer race 14 with respect to the inner race in the clockwise direction as indicated by the arrow 30 in FIG. 3. (The disengaged position of the roller 16 is greatly exaggerated in FIG. 3 for purposes of illustration that will become more clear in the detailed explanation later in this specification.) Thus the outer race 14 overruns the inner race 12, that is free wheels in the clockwise direction, or conversely, the inner race 12 overruns the outer race 14 in the counter clockwise direction.

The cage assembly 18 comprises a flat end ring 32 that has an outer plurality of circumferentially spaced fingers 34 and an inner plurality of circumferentially spaced fingers 36. The flat end ring 32 lies against a face of the outer race 14, the bottom face as viewed in FIG. 1, with the fingers 34 and 36 protruding into the annular space between the races 12 and 14. The outer fingers 34 fit into the slots 26 to key the cage assembly 18 to the outer race 14 so that the cage assembly 18 and the outer race 14 rotate together.

The inner fingers 34 fit into slots of bearing blocks 38 that are associated with each respective roller 16. The bearing blocks 38, which may be made of thermoplastic or other suitable materials, retain the rollers 16 axially by means of thin wing extensions 40 at one end. The thermoplastic bearing blocks 38 have axial slots at the other end that anchor one end of the energizing springs 20 so that the other end of the energizing springs 20 engage the rollers 16 and bias them toward a engaged position with the races 12 and 14.

Other type cages may be used, such as those that are generally disclosed in U.S. Pat. Nos. 3,760,914 and 3,917,036 discussed above, where the energizing springs are anchored directly on he cage. It is also possible to anchor the energizing springs on the cam race itself, for example, as shown in U.K. Patent Application GB 2 229 236 that is also discussed earlier.

As indicated above the one-way roller clutch of this invention has smaller variations in roller displacement and lift off and more consistent clutch engagement response times over the operating speed range of the one-way roller clutch without producing significantly higher drag and wear at the lower speeds.

Figure 7:
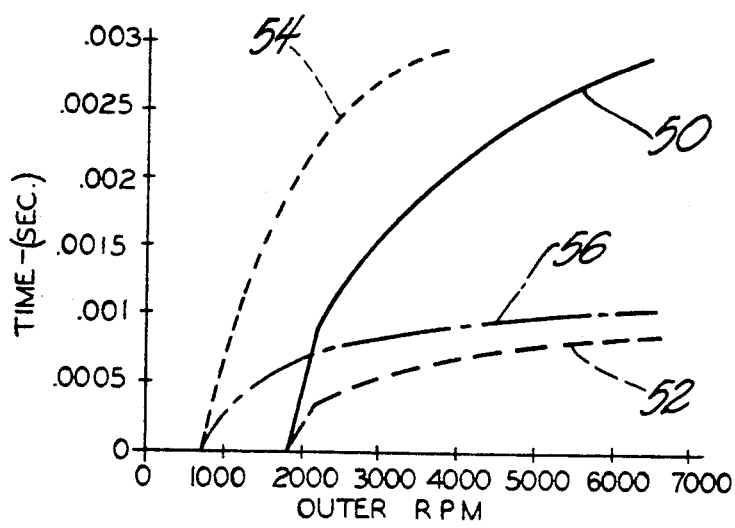
FIG. 7 is a graph comparing response times of one-way clutches having linear rate and variable rate springs.
Figure 2:
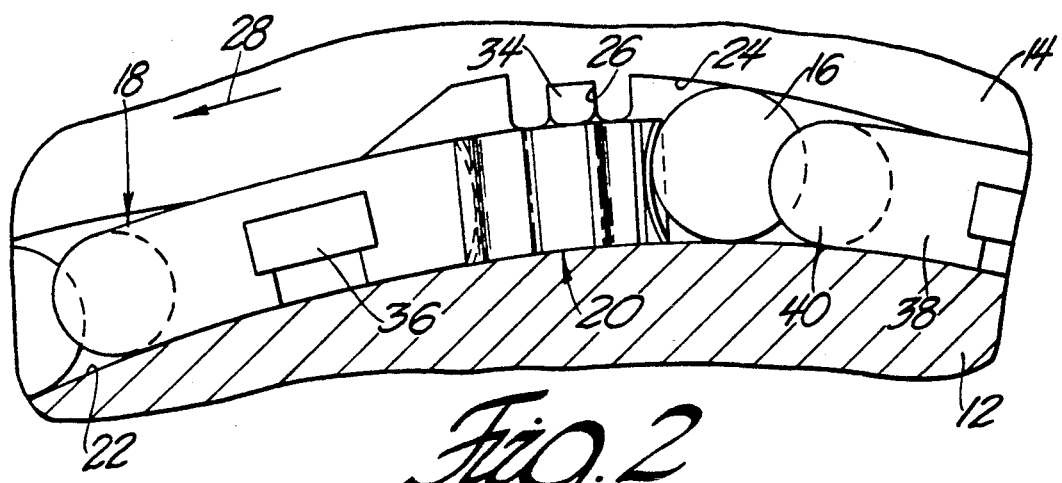
FIG. 2 is an enlargement of a portion of FIG. 1 showing the rollers in an incipient engagement position.
Figure 6:
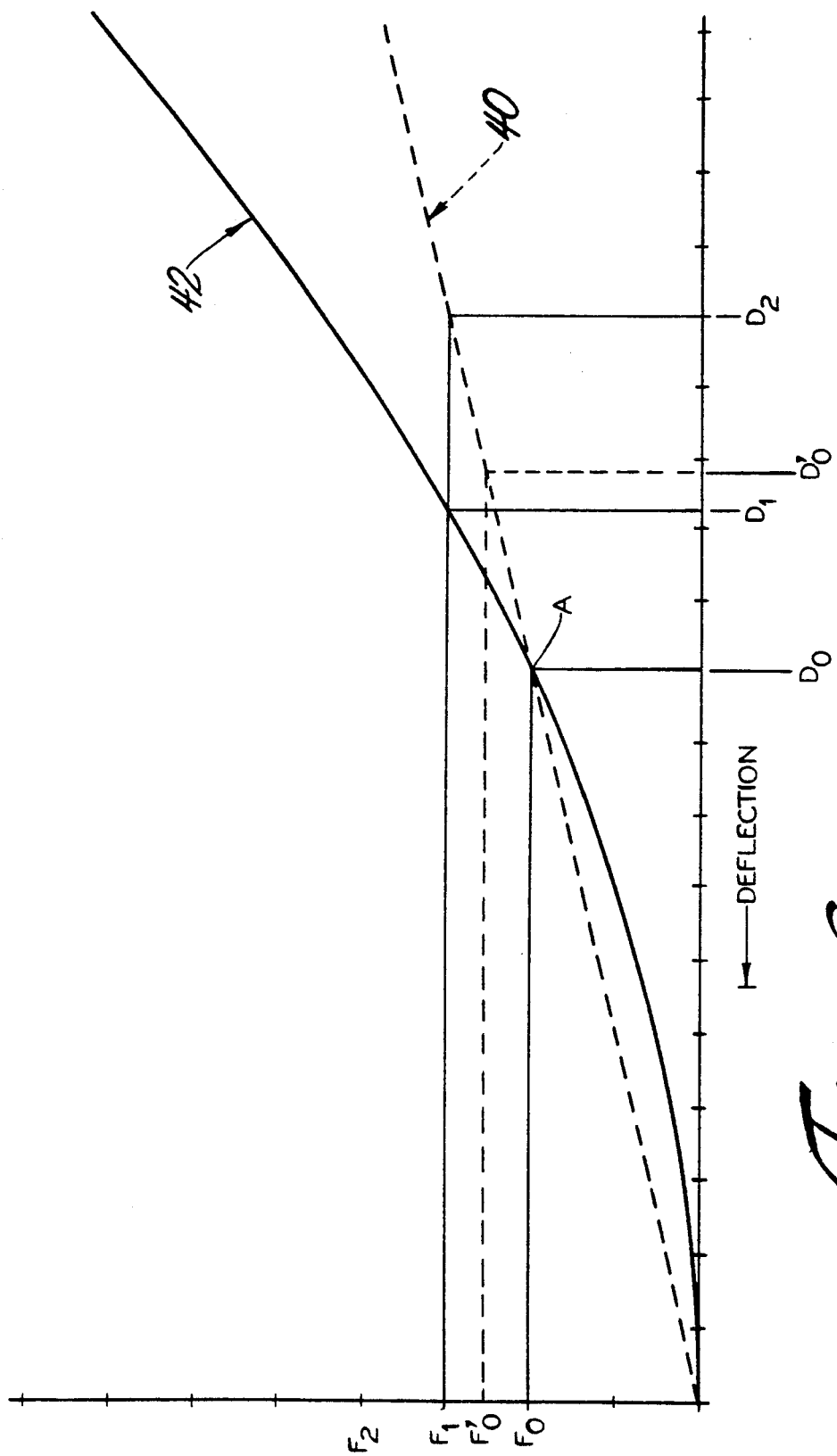
FIG. 6 is a graph comparing the force deflection curves of linear rate and variable rate springs.

The manner of achieving this result can be explained in conjunction with FIGS. 2 and 3 and the charts of FIGS. 6 and 7.

FIG. 2 shows the rollers 16 engaging cylindrical surface 22 of the inner race 12 and the clutch cam surfaces 24 of the outer race 14 under the bias of the energizing springs 20. This is an incipient engagement position for the rollers 16 which means that one-way roller clutch 10 either locks up or free wheels nearly instantly in response to the torque input when the one-way roller clutch is at zero speed. If torque is applied to the outer race 14 in the counter clockwise direction as indicated by the arrow 28, the rollers 16 move clockwise relative to the outer race 14 and down the clutch cam surfaces 24 a small amount wedging themselves between the races 12 and 14 so that one race drives the other in one direction. On the other hand, if torque is applied to the outer race 14 in the clockwise as indicated by the arrow 30 in FIG. 3, the rollers 16 move clockwise relative to the outer race 14 and up the clutch cam surfaces 24 a small amount from the position shown in FIG. 2 to the position shown in FIG. 3. This produces a small gap between the rollers 16 and the surface 22 and frees the races 12 and 14 so that one race free wheels with respect to the other in one direction. (The free wheel position of the roller 16 shown in FIG. 3 is greatly exaggerated for the purpose of illustrating the gap.)

Very little spring force is required to keep the rollers in the incipient engagement position shown in FIG. 2 at zero speed because the spring force needs only counteract gravity and friction. However, as the speed of the one-way roller clutch increases, centrifugal force which does not exist at zero speed becomes an important factor. This is because centrifugal force moves the rollers 16 radially outward and up the cam clutch surfaces 24 and because centrifugal force increases exponentially as the speed increases, that is, in proportion to the square of the rotational speed.

FIG. 6 shows the force deflection characteristics of linear and variable rate springs. The linear rate energizing springs of the prior art are designed to produce spring forces that increase linearly with increasing deflection as represented by the dashed line 40 in the FIG. 6 graph. On the other hand, the variable rate energizing springs in accordance with this invention are designed to produce spring forces that increase exponentially with increasing deflection, as represented by the solid curve 42 in FIG. 6. The spring force curve 42 is similar to the centrifugal force curve of the rollers 16 that also increases exponentially with increasing speed. Consequently the forces produced by variable rate energizing springs can be matched to the centrifugal forces produced by the rollers more closely than is possible with the forces produced by constant rate energizing springs which are linear in nature. Thus the spring forces of the variable rate energizing springs 20 counteract the centrifugal force of the rollers more effectively.

This is demonstrated by FIG. 6 which shows that variable rate spring (solid curve 42) produces higher forces at higher deflections above a cross over point A and lower forces at lower deflections in comparison the linear rate spring (dashed line 40). The cross over point A represents the initial spring deflection $D_o$ that is built into the one-way roller clutch and the corresponding preload force $F_o$ that produces drag up to roller lift off.

The lower forces produced by the variable rate springs are not of any consequence because both the variable rate springs and the linear rate springs both produce the same drag as determined by the cross over point A that corresponds to the initial preload that determines when roller lift off occurs. However, the higher forces produced by the variable rate springs at higher deflections is very significant because the linear rate springs require a substantially greater deflection to counteract the same centrifugal force.

For instance, to counteract a centrifugal force that produces a tangential component $F_1$, to the left as viewed in FIGS. 2 and 3, both the variable rate spring and the linear rate spring must produce an equal and opposite spring force $F_1$ to the right. In order to produce such a force, the linear rat spring must deflect to $D_2$ whereas the variable rate spring need only deflect to $D_1$ which is less than half the additional deflection of the linear spring from $D_0$ to $D_2$ as indicated by the chart of FIG. 6. The rollers of the one-way roller clutch translate the same amount as this additional deflection. Consequently the linear springs allow the rollers to move more than twice as far away from the incipient engagement position as the variable rate springs do. Moreover, the deflection advantage of the variable rate spring increases as the required spring force needed to counteract the centrifugal force of the rollers increases due to the increasing spread between the variable rate spring (solid curve 42) and the linear rate spring (dashed line 40). This being the case, the response time for engaging roller clutches having variable rate springs is much shorter than those having constant rate springs particularly as the rotational speed increases.

The additional deflection of the linear rate spring can be reduced to match that of the variable rate spring at a particular speed by increasing the initial deflection of the linear rate spring to $D'_0$ so that both springs produce the same force $F_1$ at the same roller translation. (In other words $D_2 - D'_0 = D_1 - D_0$). However, as noted on the FIG. 6 graph, this also increases the drag for the linear rate spring to $F'_0$. Moreover, the variable rate spring still has an advantage at rotational speeds above the particular speed where the roller translations are matched. This is easily demonstrated by considering the deflection required to produce the higher spring force $F_2$ even when the new initial deflection $D'_0$ is taken into account.

FIG. 7 compares the response times for roller clutches having linear rate springs with those that have variable rate springs. In FIG. 7, the solid curves 50 and 52 represent roller clutches that are designed for roller lift off at about 1800 rpm and that have linear rate springs and variable rate springs respectively. A comparison of these two solid curves shows that the response time for the roller clutch having variable rate springs is much shorter and that this advantage increases with increasing speed. Moreover the response time for the variable rate spring is very short and tends to flatten out. This means that the roller displacement is small when the roller clutch overruns and nearly the same for all rotational speeds. In other words, the roller displacement in a roller clutch having variable rate springs is relatively insensitive to rotational speeds which is an advantage of the invention.

The dashed curves 54 and 56 represent roller clutches that have rollers twice the diameter of the rollers in the roller clutches represented in the respective solid curves 50 and 52. Because of the larger size and heavier mass, these roller clutches have a lower roller lift off at about 900 rpm. However, a comparison of these two dashed curves shows that the response time for the roller clutch having the variable rate spring is still much shorter and that this advantage still increases with increasing rotational speed. The response time curve 56 for the variable rate spring still is very short and still tends to flatten out. Moreover a comparison of the curves 52 and 56 shows that the response times for the two clutches are nearly the same with the curves converging toward each other as rotational speed increases. This means that the roller size or mass has less of an effect on spring deflection for roller clutches having variable rate springs than for roller clutches having linear rate springs. Furthermore the roller displacement in the roller clutch having variable rate springs is about the same in spite of roller size or mass. In other words, the roller displacement and response time for clutches having variable rate springs are relatively insensitive to roller size or mass. This is another advantage of the invention.

The following equations were used to derive the chart of FIG. 7.

For the linear spring:

$$t = \sqrt{\frac{2m}{k}(x - x\ln x)}$$

For the variable rate spring:

$$t = \sqrt{\frac{-2m}{k}(\ln x)}$$

These equations are easily derived from simple kinetics for the rolling element, where t is the engagement time; m is the roller mass; x is the spring displacement, and k is the spring rate.

It is evident from the foregoing discussion that the one-way roller clutch having variable rate energizing springs in accordance with this invention have smaller variations in lift off and more consistent response times without any significant increase in drag and wear than the prior art one-way roller clutches that have constant rate energizing springs.

Figure 4:
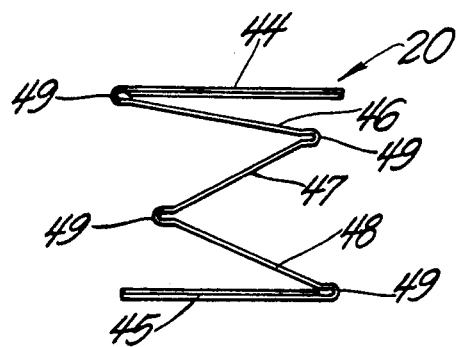
FIG. 4 is a top view of an exemplary energizing spring for the one-way roller clutch that is shown in FIGS. 1, 2 and 3.
Figure 5:
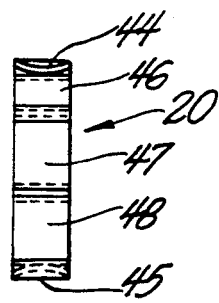
FIG. 5 is a front view of the energizing spring.

An example of a suitable variable rate energizer spring 20 is shown in FIGS. 4 and 5. The energizer spring 20 is made from a flat thin strip of resilient metal, such as stainless steel. The spring 20 has a substantially uniform height as shown in FIG. 5 and is generally accordion shaped in plan view as shown in FIG. 4. The spring 20 has parallel end segments 44 and 45 that are part cylindrical in cross section which makes the end segments relatively rigid and more efficient in transferring forces to the bearing blocks 38 and rollers 16. End segment 44 fits in the end slot of the bearing block 38 to anchor the one end of the spring 20 on the cage assembly 18. The other part cylindrical end segment 45 engages the roller 16.

The spring 20 has three interconnected beams 46, 47 and 48 between the parallel end segments 44. The length of each beam is different and the angles between the individual beams are different as well. The different lengths and angles of each beam achieves a change in spring rate with increasing deflection that is generally exponential in nature. This is somewhat evident from FIG. 4 where it is clear that the beam 46 bottoms out on the end segment 44 first, leaving beams 47 and 48 to support an increasing load. Once the beam 46 bottoms out, the spring 20 is substantially stiffer and its spring rate has increased. Another feature of the spring 20 is the use of elongated pinch loops 49 at the ends of the beams 46, 47 and 48 that force the beams to support the load while preventing additional stresses at the beam ends. This improves fatigue life.

Other spring shapes having the requisite variable spring force characteristic, which in general terms is exponential in nature, are also possible. For example a tapered or conical coil spring appears feasible. An elastomeric material of various shapes may also be used in this invention.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A one-way roller clutch comprising:
   an inner race and an outer race having a plurality of rollers disposed between the races, one of the races having a plurality of circumferentially spaced clutch cam surfaces that are engaged by the rollers in a clutch engaged position; and non-linear spring means biasing the rollers toward the clutch engaged position.

2. The one-way roller clutch as defined in claim wherein the non-linear spring means has a variable spring rate that increases with increasing deflection of the spring means at least above a predetermined deflection of the spring means to counteract the effects of centrifugal force acting on the rollers at higher speeds.

3. The one-way roller clutch as defined in claim wherein the non-linear spring means has a variable spring rate that increases with increasing deflection of the spring means to counteract the effects of centrifugal force acting on the rollers.

4. The one-way roller clutch as defined in claim wherein the non-linear spring means has a variable spring rate that increases with increasing deflection of the spring means in a generally exponential manner to counteract the effects of centrifugal force acting on the rollers particularly at higher speeds.

5. A one-way roller clutch comprising:
an inner race and an outer race having a plurality of rollers disposed between the races,
one of the races having a plurality of circumferentially spaced clutch cam surfaces that are engaged by the rollers in a clutch engaged position; and
a plurality of non-linear energizing springs anchored at one end so that the other end of the springs engage the rollers and bias the rollers toward the clutch engaged position.

6. The one-way roller clutch as defined in claim 5 wherein the non-linear springs have variable spring rates that increase with increasing deflection of the springs at least above a predetermined deflection of the springs to counteract the effects of centrifugal force acting on the rollers at higher speeds.

7. The one-way roller clutch as defined in claim 5 wherein the non-linear springs have variable spring rates that increase with increasing deflection of the springs to counteract the effects of centrifugal force acting on the rollers.

8. The one-way roller clutch as defined in claim 5 wherein the non-linear springs have variable spring rates that increase with increasing deflection of the springs in a generally exponential manner to counteract the effects of centrifugal force acting on the rollers particularly at higher speeds.

9. A high speed one-way roller clutch comprising:
an inner race and an outer race having a plurality of rollers disposed between the races,
the outer race having a plurality of circumferentially spaced clutch cam surfaces that are engaged by the rollers in a clutch engaged position; and
a plurality of non-linear energizing springs anchored at one end so that the other end of the springs engage the rollers and bias the rollers toward the clutch engaged position.

10. The one-way roller clutch as defined in claim 9 wherein the non-linear springs have variable spring rates that increase with increasing deflection of the springs at least above a predetermined deflection of the springs to counteract the effects of centrifugal force acting on the rollers when the outer race freewheels at higher speeds.

11. The one-way roller clutch as defined in claim 9 wherein the non-linear springs have variable spring rates that increase with increasing deflection of the springs to counteract the effects of centrifugal force acting on the rollers when the outer race freewheels.

12. The one-way roller clutch as defined in claim 9 wherein the non-linear springs have variable spring rates that increase with increasing deflection of the springs in a substantially exponential manner to counteract the effects of centrifugal force acting on the rollers when the outer race freewheels particularly at higher speeds.

13. The one-way roller clutch as defined in claim 9 wherein the variable rate springs have parallel end segments that are interconnected by a plurality of slanted interconnected beams.

14. The one-way roller clutch as defined in claim 13 wherein the beams are connected to the en segments and to each other by elongated pinch loops to improve the life.

* * * * *